United States Patent [19]

Krumbein

[11] 4,089,596
[45] May 16, 1978

[54] SOUND MOTION-PICTURE CAMERA

[75] Inventor: Fritz Krumbein, Stuttgart-Mohringen, Germany

[73] Assignee: Robert Bosch GmbH, Stuttgart, Germany

[21] Appl. No.: 770,825

[22] Filed: Feb. 22, 1977

[30] Foreign Application Priority Data

Feb. 21, 1976 Germany ............................ 2607145

[51] Int. Cl.² .............................................. G03B 31/02
[52] U.S. Cl. ..................................... 352/27; 352/174; 352/179; 352/72
[58] Field of Search ................. 352/174, 178, 179, 27, 352/72

[56] References Cited

U.S. PATENT DOCUMENTS 3,880,504  4/1975  Marvin .................................. 352/27
4,059,349  11/1977 Komine .................................. 352/27

Primary Examiner—Monroe H. Hayes
Attorney, Agent, or Firm—Michael J. Striker

[57] ABSTRACT

The sound-recording unit of the camera includes a counterpressure roller and a pressure pad. When the sound-recording unit is to be used, the counterpressure roller is to be moved into an operative position in which it presses the motion-picture film against the capstan of the unit, and the pressure pad is to be moved into an operative position in which it presses the motion-picture film against the recording head of the unit. When the sound-recording unit is not to be used, the counterpressure roller and pressure pad are to be moved into inoperative positions, to prevent permanent deformation. The camera is provided with a plurality of independently activatable motion-transmitting mechanisms, each activatable from the exterior of the camera. Each of the motion-transmitting mechanisms can be used to move the counterpressure roller and the pressure pad from their inoperative to their operative positions.

15 Claims, 6 Drawing Figures

SOUND MOTION-PICTURE CAMERA

BACKGROUND OF THE INVENTION

The invention relates to sound motion-picture cameras provided with a sound-recording unit which includes components which are mounted for movement between inoperative and operative positions. Such cameras utilize film provided with for example a magnetic recording track applied to the film prior to film exposure, so that sound can be recorded onto the film along with moving images.

To this end, the camera includes a sound-recording unit. The components of the recording unit which engage the motion-picture film usually include a capstan driven by a motor, a counterpressure roller which bears against the capstan and presses the film thereagainst, a recording head, and a pressure pad which presses the film against the recording head. The counterpressure roller and the capstan are disengageable, and the pressure pad and the recording head are likewise disengageable, in order to facilitate insertion and removal of film. However, when the sound-recording unit is actually utilized, these components must be engaged, to assure that the capstan transports the film with constant speed, and to assure that the recording head properly engages the audio track on the film. Usually, the recording unit is so designed that the capstan and recording head are stationary, whereas the counterpressure roller can be shifted away from the capstan, and the pressure pad away from the recording head, and then shifted back when necessary.

It is necessary to shift the movable components (e.g., the counterpressure roller and pressure pad) away from the stationary components (e.g., the capstan and recording head) for reasons other than to facilitate insertion and removal of film. In particular, it is advantageous to effect such disengagement whenever the sound-recording unit is not in operation. The counterpressure roller, in particular, is made of elastic material. However, if it is perpetually in engagement with the capstan, even when the camera is not being used at all, it will eventually undergo a permanent deformation. Such a loss of roundness can detrimentally affect the constancy of the film transport speed, and therefore the quality of the recorded sound.

To avoid such permanent deformation, it is known to couple the carrier structure upon which the counterpressure roller and pressure pad are mounted to the camera release member through the intermediary of a resilient or yieldable linkage. The linkage is so designed that when the camera release member is activated, the disengageable components of the recording unit are moved into their operative positions against spring force, and when the user of the camera lets go of the camera release member, the disengageable components return to their inoperative positions, in which they do not contact the film.

The camera release member in present day cameras is customarily a lever, slider or pushbutton. However, cameras are frequently provided, in addition, with threaded connectors for wire or cable release attachments and/or with jacks into which remote control cables can be plugged. These are provided in order that the user of the camera can operate the camera when the camera is mounted on a tripod.

With cameras of this type, when use is made of a wire release attachment or a remote control attachment, the sound-recording unit is not utilized, because the remote control attachment, or the like, is not capable of causing the disengageable components (e.g., counterpressure roller and pressure pad) of the recording unit to assume their operative positions. These movable components of the recording unit can be moved into their operative position only by the camera release member utilized for normal camera operation, which is not activated in these circumstances.

Also, certain cameras are provided with a hand grip mounted on the housing of the camera. The hand grip is mounted for movement between an operative position and an inoperative position. When it is in its operative position, it projects downwardly, for use during hand-held operation of the camera. When it is in its inoperative position, it does not project downwardly, in order not to interfere with the mounting of the camera on a tripod. However, when in its inoperative position, the hand grip is so located that it interferes with, or positively precludes, operation of the camera release member.

SUMMARY OF THE INVENTION

It is a general object of the invention to overcome the disadvantages described above in a particularly simple manner, so as to make possible use of the sound-recording unit of the camera, irrespective of the manner in which the film transport means of the camera is to be activated.

This object can be achieved, according to one general concept of the invention, by utilizing a sound-recording unit comprised of a plurality of components (e.g., counterpressure roller and pressure pad) movable between an inoperative position (e.g., disengaged from the capstan and recording head) and an operative position (e.g., pressing against the capstan and recording head), and a plurality of independently activatable moving means, each activatable by the user of the camera, and each operative when activated for moving the movable components of the sound-recording unit from their inoperative positions to their operative positions.

According to one advantageous concept of the invention, the movable components of the sound-recording unit are mounted on a common carrier structure. The carrier structure is movable between one position in which the movable components of the recording unit are in their inoperative positions and another position in which the movable components of the recording unit are in their operative positions. Each one of the plurality of independently activatable moving means is in that case operative when activated for moving the recording-unit components from their inoperative to their operative positions, by moving the carrier structure from one to the other of the positions of the carrier structure.

According to another advantageous concept of the invention, each of the plurality of independently activatable moving means includes an activating member accessible from the exterior of the camera and located at different respective portions of the camera.

In order to avoid unnecessary current drain of the camera battery, the invention also contemplates controlling the camera battery switch in such a manner that the latter is kept open so long as the movable components of the sound-recording unit occupy their inoperative positions.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
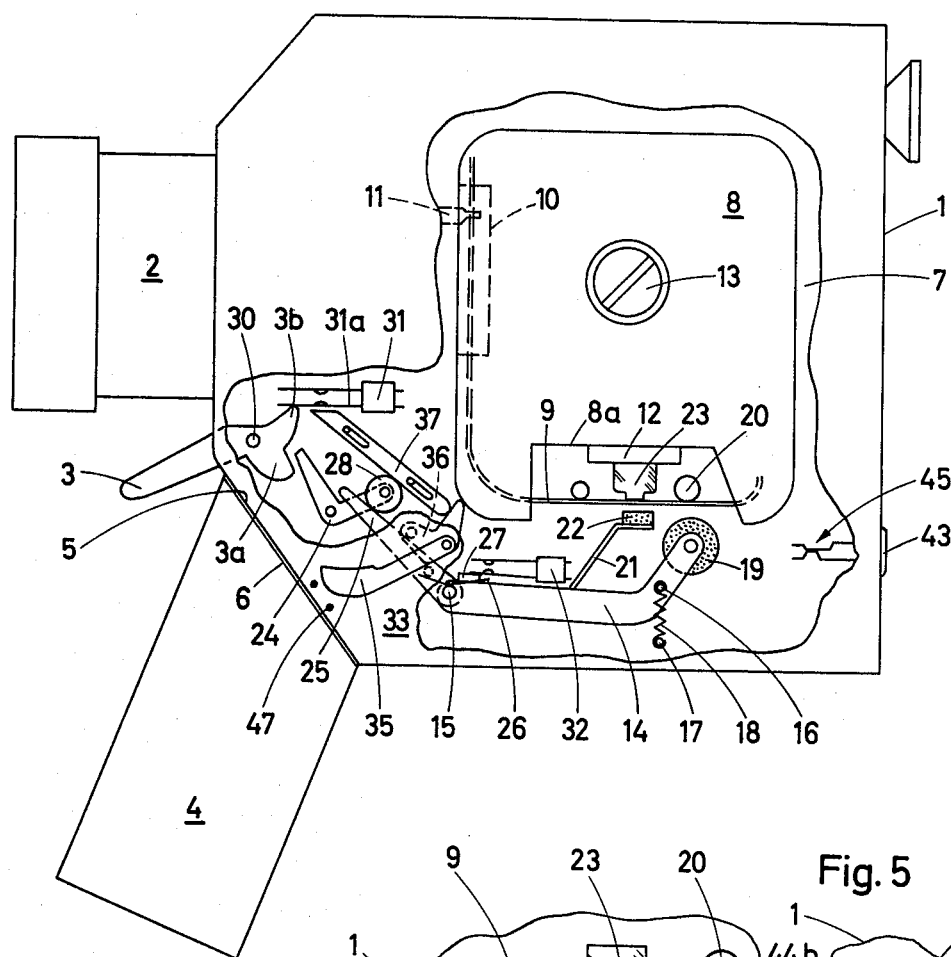
FIG. 1 is a schematic side view of a sound motion-picture camera, with a portion of the camera housing broken away to reveal the interior of the camera, including the sound-recording unit therein, with the movable components of the sound-recording unit shown in their inoperative positions, and with the hand grip of the camera shown in its downwardly projecting operative position.

The camera depicted in FIGS. 1–5 is comprised of a camera housing 1 on whose front side is mounted the camera objective 2 (FIG. 1). Located on the front side of the camera housing is an activating lever 3, described below, by means of which the camera can be set into operation.

Figure 3:
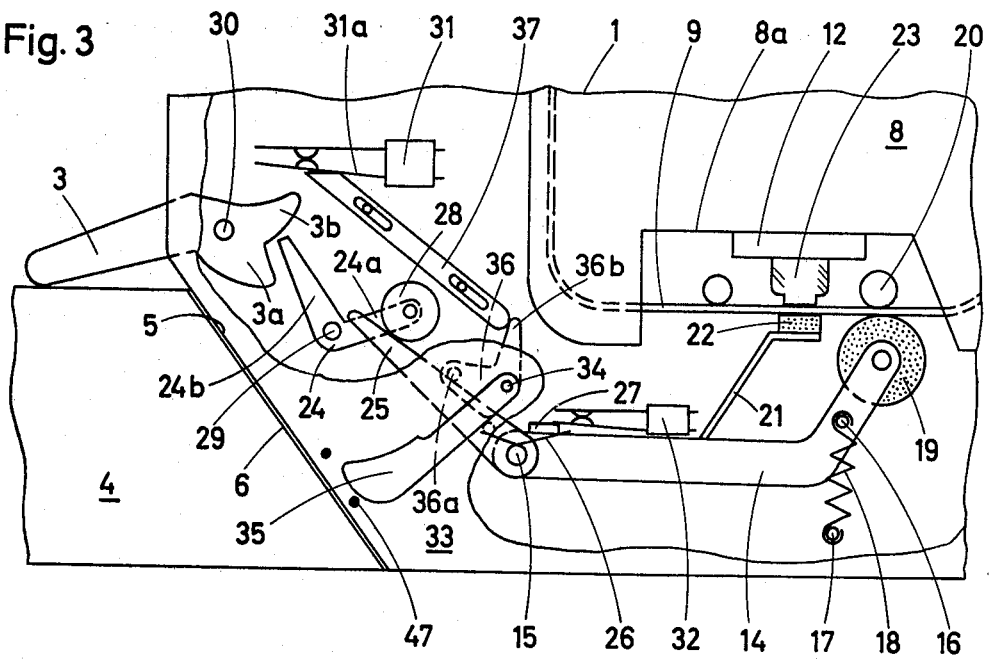
FIG. 3 depicts the camera of FIG. 1 in the condition thereof shown in FIG. 2, except that the hand grip is depicted in its inoperative position.

The camera is provided with a hand grip 4 mounted on the camera housing 1 for movement between an operative position (FIG. 1) and an inoperative position (FIG. 3). In its operative position, it projects downwardly for use during hand-held operation of the camera. In its inoperative position, it projects forwardly, so as not to interfere with the mounting of the camera on a tripod. The hand grip 4 has an inclined surface 6 which adjoins a similarly inclined surface 5 of the camera housing, and the hand grip 4 is mounted on the camera housing 1 by means of a (non-illustrated) mounting peg. The hand grip 4 is turnable relative to such mounting peg between its inoperative and operative positions in such a manner that the inclined faces 5 and 6 always remain parallel to each other. As shown in FIG. 3, when the hand grip 4 is in its inoperative position, it is so located as to prevent the user of the camera from operating the activating lever 3 on the front of the camera.

The camera housing includes a film chamber 7 (FIG. 1) which is closed by means of a (non-illustrated) cover plate. The film chamber 7 accommodates a cassette 8 containing a motion-picture film 9 provided with a sound track. The film cassette 8 has a window 10, through which the film in the cassette 8 is exposed, frame-by-frame, and through which projects the pull-down member 11 of the film transport mechanism. The cassette 8 is provided at its bottom with an opening 8a. When the cassette 8 has been inserted into the film chamber 7, the opening 8a receives components of the sound-recording unit of the camera (described below), as well as a positioning bar 12. The wind-up shaft of the film cassette 8 is denoted by numeral 13.

In the interior of the camera, at the bottom thereof, there is provided a one-armed lever 14 mounted for pivoting movement on a pin 15 stationarily mounted on the camera housing. A tension spring 18 has one end hooked onto a pin 16 on lever 14 and another end hooked onto a pin 17 on the camera housing. Spring 18 tends to pivot the lever 14 clockwise.

The lever 14 constitutes a carrier structure on which is mounted the counterpressure roller 19 of the sound-recording unit of the camera. The counterpressure roller 19 is made of elastic material and, when moved from its inoperative position (FIG. 1) to its operative position (FIG. 3), enters into the opening 8a of cassette 8 and cooperates with the capstan 20 of the recording unit. Capstan 20 is driven by an electric motor at constant speed. The lever 14 also carries a leaf spring 21 on the free end of which is mounted the pressure pad 22 of the recording unit. When pressure pad 22 is moved from its inoperative position (FIG. 1) to its operative position (FIG. 3), it presses the sound track on the film 9 against the recording head 23 of the recording unit.

When a sound motion-picture recording is to be made, a (non-illustrated) microphone is connected to the sound-recording unit, and the recording head 23 records signals on the magnetic sound track of film 9. For operation of the sound-recording unit, it is necessary that the movable components of the unit, here 19 and 22, be moved from their inoperative positions (FIG. 1) to their operative positions (FIG. 3), so that the counterpressure roller 19 will press the film against the capstan 20, and so that the pressure pad 22 will press the film against the recording head 23.

If the sound-recording unit is to be out of operation for a relatively long period of time, for example when the camera is not in use at all, it is necessary to disengage the movable components 19, 22 from the stationary components 20, 23, so that the movable components will not be subjected to a permanent deformation. To this end, the components 19, 22, or more particularly the carrier lever 14 therefor, is coupled to the activating lever 3 on the front of the camera. Ordinarily, the movable components 19, 22 are in their inoperative positions. When activating lever 3 is operated, components 19, 22 are moved to their operative positions. The coupling of the carrier lever 14 to the activating lever 3 is established by means of an angled lever 24 and a one-armed lever 25. Lever 25 is mounted for pivoting movement on the stationary pivot pin 15, the same one upon which the carrier lever 14 is mounted. A torsion spring 26 has one end which bears against a pin provided on the lever 25 and another end which bears upon a tab 27 on lever 14. Torsion spring 26 is stronger than tension spring 18, and tends to cause the two one-armed levers 25 and 14 to pivot in unison about pin 15, as though the two levers 25 and 14 were a single two-armed lever.

Figure 2:
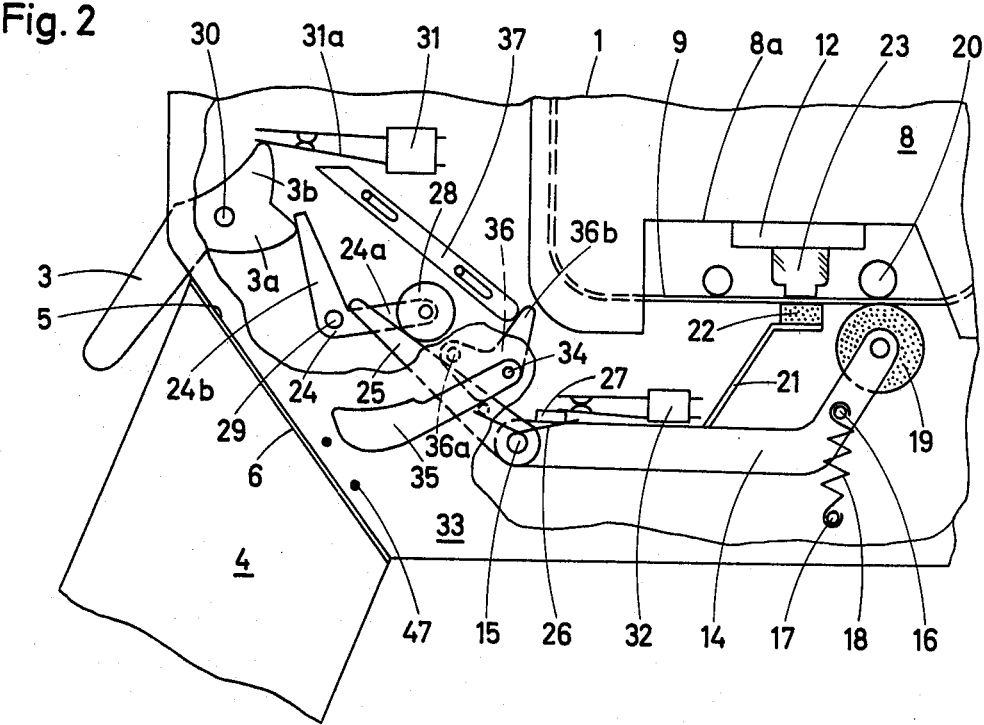
FIG. 2 depicts the camera of FIG. 1 during sound motion-picture filming, with the movable components of the recording unit shown in their operative positions, and with the hand grip in the same position as shown in FIG. 1.

The free end of one-armed lever 25 is engaged by a roller 28 mounted on one arm 24a of the angled lever 24. Lever 24 is mounted for pivoting movement on a stationary pivot pin 29 (FIGS. 2 and 3). The other arm 24b of lever 24 cooperates with a projection 3a on the activating lever 3, the pivot pin of which is denoted by numeral 30. Another projection 3b on lever 3 serves to close a switch 31, which is open when the camera is not in operation. The contact blade 31a of switch 31 is located in the path of movement of projection 3b. Switch 31 serves as a main switch, i.e., when the camera is not in operation, it disconnects the camera battery 50, located for example in the hand grip 4, from the camera circuitry, in particular the automatic diaphragm control circuit of the camera, in order to prevent unnecessary current drain from the camera battery. A further switch 32 is located in the current path of the film transport motors of the camera and is positioned in the path of movement of tab 27. This switch serves as the release switch for the camera. It closes when the carrier lever 14 is moved from its inoperative (FIG. 1) position.

Thus, the components described above together constitute a first moving means for moving the recording-unit components 19, 22 from the inoperative to their operative positions, the activating lever 3 constituting the activating member of this first moving means.

Another such moving means is provided for activation by the user of the camera when the hand grip 4 is in its inoperative (FIG. 3) position, preventing operation of the activating member 3 of the first moving means.

This second moving means is comprised of an activating lever 35 located on the exterior of the side wall 33 of the camera housing. It is mounted on a pivot pin 34 (FIGS. 2 and 3). An angled lever 36 is connected to the activating lever 35, non-rotatable relative to the latter. Lever 36 is located in the interior of the camera housing. On arm of lever 36 is provided with a pin 36a which, upon depression of activating lever 35, bears down upon the one-armed lever 25. The other arm of lever 36 has the form of a projection 36b located near the lower end of a slider 37. When activating lever 35 is depressed, projection 36b shifts slider 37 upwardly, so as to close switch 31.

Figure 4:
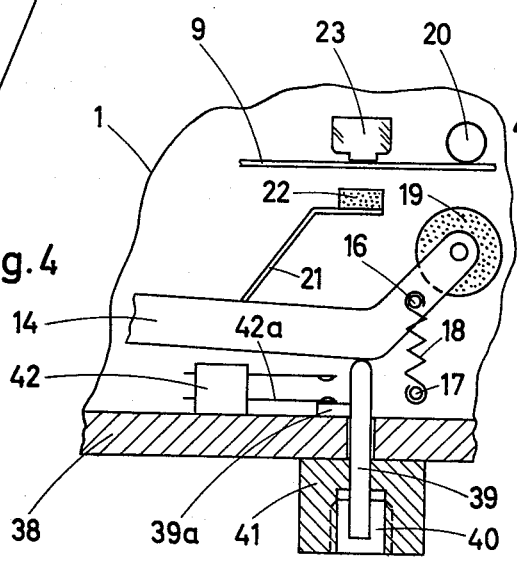
FIG. 4 depicts on an enlarged scale a part of the bottom portion of the camera of FIGS. 1–3, showing the means for mounting the camera on a tripod and a cooperating moving means for moving the movable components of the recording unit into their operative positions.
Figure 5:
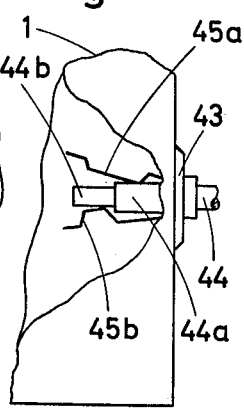
FIG. 5 depicts on a larger scale a portion of the camera provided with means for connecting a remote control attachment to the camera.

The camera is provided with a third moving means, for moving the recording-unit components 19, 22 from their inoperative to their operative positions. This third moving means comprises an activating member 39 (FIG. 4) located at the bottom of the camera housing 1, in the vicinity of the mounting means 40, 41 for mounting the camera on a tripod. In FIG. 4, the activating member of the third moving means is a shiftably guided pin 39 located in the bottom wall 38 of the camera housing 1. Activating pin 39 is located within a threaded bore 40 in a tripod-mounting spigot 41. Activating pin 39 acts directly upon the carrier lever 14. Pin 39 is provided with a projection 39a, in whose path of movement is located the contact blade 42a of a switch 42. Switch 42 serves the same function as switch 31, and is connected in parallel to switch 31.

Finally, the camera is provided with a jack 43 for receiving the mutually insulated contacts 44a, 44b of a remote-control cable 44. A switch 45 associated with the jack 43 is connected in series with the release switch 32, and is comprised of two contact blades 45a, 45b. The contact 45a cooperates with the inner contact pin 44a of the remote-control cable 44, whereas the contact 45b cooperates with the outer contact 44b of the cable 44.

Figure 6:
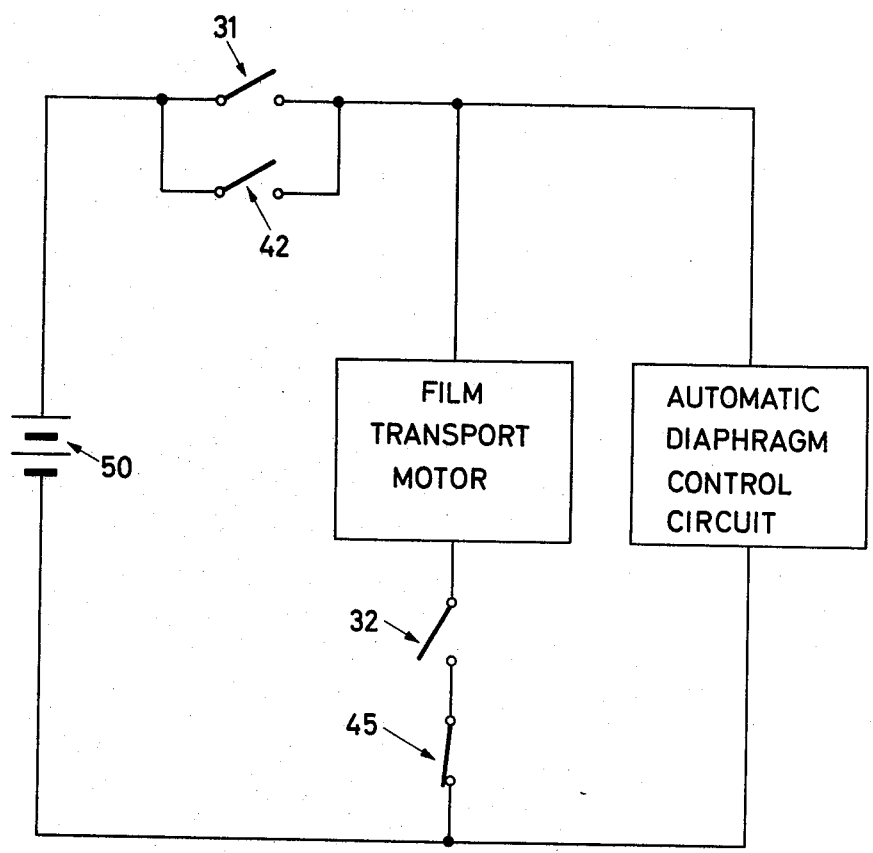
FIG. 6 shows the cooperation of the switches 31, 32, 42 and 45 of FIGS. 1–5, the camera battery, and the automatic diaphragm control circuit of the camera.

FIG. 6 schematically depicts the relevant portion of the internal circuitry of the camera. The camera battery 50 is connectable to the automatic diaphragm control circuit of the camera by means of the main switches 31, 42, which are connected in parallel. When one of the two main switches 31, 42 is closed, the film transport motors of the camera can be energized by closing release switch 32, since remote-control release switch 45 is normally closed, i.e., when the remote-control cable 44 is not inserted into jack 43. When remote-control energization and deenergization of the motor is to be effected, switch 45 is normally open, by virtue of the insertion of the remote-control cable into jack 43, and switch 32 will have first been closed as a result of movement of carrier lever 14 to its operative position.

The illustrated camera operates as follows:

When the hand grip 4 is in the operative position of FIGS. 1 and 2, for use during hand-held operation of the camera, the user is able to control the operation of the camera by means of the activating lever 3. Specifically, the user tilts the activating lever counterclockwise. As a result, projection 3b first closes the main switch 31, thereby energizing the automatic diaphragm control circuit of the camera, so that the diaphragm aperture will assume the proper size for the prevailing scene brightness level, prior to the initiation of actual filming. Thereafter, the projection 3a of the activating lever 3 pivots the arm 24b of angled lever 24 clockwise. As a result, the roller 28 on the lever 24 presses down upon one-armed lever 25, causing the latter to turn counterclockwise. This counterclockwise movement of lever 25 is transmitted by torsion spring 26 to carrier lever 14, which likewise pivots counterclockwise. As a result, carrier lever 14 assumes the position shown in FIG. 2. In this position of carrier lever 14, the tab 27 on lever 14 closes release switch 32, thereby energizing the film transport motors which drive the pull-down member 11 and the capstan 20. Also, in this position of lever 14, the counterpressure roller 19 bears against the capstan 20, and the pressure pad 22 bears against recording head 23. As a result, the pull-down member 11 of the intermittent film transport mechanism effects intermittent film transport at a speed equal to that at which the capstan 20 effects continuous film transport. Thus, sound is recorded onto the magnetic track of film 9 along with the recording of the image on the frames of the film. When the user lets go of activating lever 3, the parts of the first moving means, under the action of the tension spring 18 connected to carrier lever 14, return to the inoperative position of FIG. 1. The inherent spring force of contact blade 31a of main switch 31 causes switch 31 to open, so that both switches 31 and 32 are again open.

In the event the hand grip 4 is in the in-operative position of FIG. 3, so that the activating lever 3 cannot be operated by the user, the user can instead operate the activating lever 35. The user pivots the lever 35 counterclockwise, until the lever 35 assumes a position adjoining a mark 47 provided on the exterior of the camera housing. As a result, the lever 36, non-rotatably coupled to the lever 35, likewise tilts counterclockwise. The pin 36a presses the lever 25 counterclockwise, causing the carrier lever 14 to move counterclockwise, as a result of which components 19, 22 assume their operative positions. Also, the projection 36b displaces the slider 37 upwardly, thereby closing main switch 31. The closing of main switch 31 occurs before the components 19, 22 assume their operative positions.

If the camera is to be used mounted on a tripod, the user of the camera first inserts the remote-control cable 44 into the jack 43. As a result, the contacts 45a, 45b of the switch 45, connected in series with release switch 32, are forced apart, thereby opening switch 45. Next, the user screws the threaded mounting member of the tripod into the threaded mounting bore 40 of spigot 41. As a result, the threaded mounting member of the tripod (not shown) displaces the activating pin 39 upwardly. This causes projection 39a to close main switch 42. Pin 39 itself pivots carrier lever 14 counterclockwise, thereby moving components 19, 22 to their operative positions. Now, by operating a switch located at the remote end of control cable 44, the user can energize and deenergize the motors which drive the intermittent film transport mechanism and the capstan 20.

The activating lever 35 can be arrested in its activated position. In this way, the operation of the camera drive motor can be controlled using the remote-control cable even when a tripod is not available, or is not to be used, and likewise in the event that the alternative moving means 39, 39a were not provided. In that case, however, the user connects the remote-control cable to the jack 43 before he operates the activating lever 35, so that the activating lever 35 will not prematurely energize the film transport motors, but instead merely move recording-unit components 19, 22 to their operative positions.

It will be understood that each of the elements described above, or two or more together, may also find a useful application in other types of circuits and constructions differing from the types described above.

While the invention has been illustrated and described as embodied in a camera of particular design, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a sound motion-picture camera of the type provided with a sound-recording unit including at least one component mounted for movement between an inoperative position to be assumed when the sound-recording unit is not in operation and an operative position to be assumed when the sound-recording unit is in operation, a plurality of independently activatable moving means each operative when activated for moving the component from one to the other of its positions.

2. In a camera as defined in claim 1, the sound-recording unit of the camera including at least two such components, each mounted for movement between an inoperative and an operative position, the sound-recording unit including a carrier structure, said components of the sound-recording unit both being mounted on the carrier structure, and means mounting the carrier structure for movement between a position in which said components are in their inoperative positions and a position in which said components are in their operative positions, the plurality of independently activatable moving means each comprising means for moving said components between said inoperative and operative position by moving the carrier structure.

3. In a camera as defined in claim 1, the camera being comprised of a camera housing, the plurality of independently activatable moving means each including a respective activating member, the activating members all being located accessible to the user of the camera from the exterior of the housing and being located at different respective parts of the camera housing.

4. In a camera as defined in claim 3, the activating member of one of the independently activatable moving means being located on the front of the camera housing.

5. In camera as defined in claim 4, the activating member of another of the independently activatable moving means being located on the side of the camera housing.

6. In a camera as defined in claim 1, the camera being comprised of a camera housing having a bottom wall, the camera being provided with mounting means located on the bottom wall for mounting the camera on a tripod, the activating member of one of the independently activatable moving means being located on the bottom wall of the camera housing at the location of the mounting means.

7. In a camera as defined in claim 1, the camera including a battery, internal circuitry, and main switch means connecting the former to the latter and operative when activated for energizing the internal circuitry, the plurality of independently activatable moving means each comprising means operative for automatically activating the main switch means when moving the recording-unit component from the inoperative to the operative position.

8. In a camera as defined in claim 1, the camera including a battery, film transport means, and transport switch means connecting the battery to the film transport means and operative when activated for initiating operation of the film transport means, the plurality of independently activatable moving means each comprising means operative for automatically activating the transport switch means when moving said recording-unit component from the inoperative to the operative position.

9. In a camera as defined in claim 1, the camera being comprised of a camera housing, a first one of the plurality of independently activatable moving means including a respective first activating member located on the exterior of the camera housing, the camera further including mounting means located on the bottom of the camera housing for mounting the camera on a tripod, a hand grip mounted on the camera housing for movement between an operative position in which the hand grip projects downwardly for use during hand-held operation of the camera and an inoperative position in which the hand grip does not project downwardly, whereby not to interfere with the mounting of the camera on a tripod, but in which the hand grip prevents the user of the camera from operating the first activating member, a second one of the plurality of independently activatable moving means including a respective second activating member located accessible from the exterior of the camera housing at a position such that the hand grip when in the inoperative position thereof does not prevent operation of the second activating member.

10. In a camera as defined in claim 9, the second activating member being located in the vicinity of the mounting means for mounting the camera on a tripod and being so positioned as to be operated by a tripod onto which the camera is being mounted.

11. In a camera as defined in claim 10, the camera including a battery, an automatic diaphragm control circuit, and film transport motors, battery switch means connecting the battery to the automatic diaphragm control circuit and operative for energizing the automatic diaphragm control circuit in response to operation of the first activating member and also in response to operation of the second activating member, film transport switch means connecting the battery to the film transport motor and operative for energizing the film transport motor in response to operation of the first activating member.

12. In a camera as defined in claim 11, further including connecting means provided on the camera housing for connecting to the film transport switch means a remote control attachment.

13. In a camera as defined in claim 1, the camera being comprised of a camera housing, one of the plurality of independently activatable moving means including activating member located on the exterior of the camera housing, another of the plurality of independently activatable moving means also including an activating member located on the exterior of the camera housing mounted for movement between an unactivated position and an activated position and arrestable in the activated position, the camera including a battery, an automatic diaphragm control circuit, and film transport motors, and connecting means provided on the camera housing for connecting to the camera a remote control unit, battery switch means connecting the battery to the automatic diaphragm control circuit and operative for energizing the automatic diaphragm control circuit in response to operation of one of the activating members and also in response to operation of the other of the activating members, and film transport switch means connecting the battery to the film transport motors and operative for energizing the film transport motors in response to operation of a remote control attachment connected to the camera by the connecting means.

14. In a camera as defined in claim 1, the sound-recording unit of the camera including at least two such components, each mounted for movement between an inoperative position and an operative position, one of the components being a counterpressure roller and the other being a pressure pad.

15. In a camera as defined in claim 9, the sound-recording unit of the camera including at least two such components, each mounted for movement between an inoperative position and an operative position, one of the components being a counterpressure roller and the other being a pressure pad.

* * * * *